United States Patent
Diggins (10) Patent No.: US 9,977,992 B2
(45) Date of Patent: May 22, 2018

(54) IDENTIFYING POINTS OF INTEREST IN AN IMAGE

(71) Applicant: Snell Advanced Media Limited, Reading, Berkshire (GB)

(72) Inventor: Jonathan Diggins, Lovedean (GB)

(73) Assignee: Snell Advanced Media Limited, Reading, Berkshire (GB)

( * ) Notice: Subject to any disclaimer, the term of this patent is extended or adjusted under 35 U.S.C. 154(b) by 116 days.

(21) Appl. No.: 14/928,298

(22) Filed: Oct. 30, 2015

(65) Prior Publication Data
US 2016/0055642 A1    Feb. 25, 2016

Related U.S. Application Data

(63) Continuation-in-part of application No. 13/780,072, filed on Feb. 28, 2013.

(30) Foreign Application Priority Data

Feb. 28, 2012   (GB) .................................. 1203431.0

(51) Int. Cl.
*G06T 7/00* (2017.01)
*G06K 9/62* (2006.01)
(Continued)

(52) U.S. Cl.
CPC ......... *G06K 9/6202* (2013.01); *G06K 9/4604* (2013.01); *G06K 9/4642* (2013.01);
(Continued)

(58) Field of Classification Search
CPC .... G06T 7/10; G06T 5/20; G06T 5/50; G06T 2207/10024; G06T 2207/10016;
(Continued)

(56) References Cited

U.S. PATENT DOCUMENTS 4,677,476 A * 6/1987 Kondo .................. H04N 5/145
                                                  348/416.1
4,853,970 A   8/1989 Ott et al.
(Continued)

FOREIGN PATENT DOCUMENTS

EP    000367295 A2 *  5/1990    ............... G06T 7/74
EP    0367295 A2     5/1990
(Continued)

OTHER PUBLICATIONS

Efficient Multiresolution Scene Change Detection by Wavelet Transformation, Zheng-yun Zuang, Commuications and Multimedia Lab, Dept. of Comp. Sci. and Information Tech., National Taiwan University, Taipei, Taiwan, 1997 IEEE.
(Continued)

*Primary Examiner* — Sean Conner
*Assistant Examiner* — Pinalben Patel
(74) *Attorney, Agent, or Firm* — Michael Best & Friedrich LLP (57) ABSTRACT

Points of interest are identified in an image to characterize that image by dividing the image tiles consisting of adjacent pixels; finding within each tile the position of a pixel with an extremum value and ascribing that extremal value to the tile; identifying a tile with an extremal value which is more extreme than that of all adjacent tiles; and selecting as a point of interest the position within the image of the pixel with the extremum value in that identified tile.

17 Claims, 7 Drawing Sheets

(51) Int. Cl.
*G06T 5/50* (2006.01)
*G06K 9/46* (2006.01)
*G06T 5/20* (2006.01)
*G06K 9/32* (2006.01)

(52) U.S. Cl.
CPC .............. *G06K 9/4652* (2013.01); *G06T 5/20* (2013.01); *G06T 5/50* (2013.01); *G06K 9/3233* (2013.01); *G06T 2207/10016* (2013.01); *G06T 2207/10024* (2013.01)

(58) Field of Classification Search
CPC .. G06K 9/4652; G06K 9/4642; G06K 9/3233; G06K 9/4604; G06K 9/6202
See application file for complete search history.

(56) References Cited

U.S. PATENT DOCUMENTS

| | | | |
|---|---|---|---|
| 5,995,649 A * | 11/1999 | Marugame | G06K 9/6202 345/419 |
| 6,181,815 B1 * | 1/2001 | Marugame | G06T 7/55 345/419 |
| 6,735,343 B2 * | 5/2004 | Michael | G06K 9/4604 345/420 |
| 8,351,705 B2 | 1/2013 | Knee | |
| 9,742,974 B2 * | 8/2017 | Tang | H04N 5/23206 |
| 2002/0146176 A1 | 10/2002 | Meyers | |
| 2004/0091151 A1 * | 5/2004 | Jin | G06K 9/48 382/199 |
| 2005/0276484 A1 | 12/2005 | Chen | |
| 2007/0058717 A1 * | 3/2007 | Chosak | G06K 9/32 375/240.08 |
| 2007/0116367 A1 | 5/2007 | Yamamoto | |
| 2010/0150445 A1 | 6/2010 | Fan et al. | |
| 2011/0026763 A1 | 2/2011 | Diggins | |
| 2011/0085733 A1 * | 4/2011 | Knee | G06K 9/6211 382/190 |
| 2011/0170774 A1 | 7/2011 | Lee et al. | |
| 2013/0051657 A1 | 2/2013 | Ostermann et al. | |
| 2013/0329076 A1 | 12/2013 | Shaw | |
| 2015/0049955 A1 * | 2/2015 | Stoeffler | G06K 9/6202 382/220 |
| 2016/0150211 A1 * | 5/2016 | Hwang | G06T 3/0093 348/43 |
| 2016/0379370 A1 * | 12/2016 | Nakazato | G06K 9/4604 382/103 |

FOREIGN PATENT DOCUMENTS

| | | |
|---|---|---|
| EP | 2317459 A1 | 5/2011 |
| GB | 2474281 A | 4/2011 |

OTHER PUBLICATIONS

COMP 102: Excursions in Computer Science, Lecture 17: Multimedia Data Compression, Instructor: Joelle Pineau, Oct. 27, 2011.
A Pixel Classification System for Segmenting Biomedical Images Using Intensity Neighbourhoods and Dimension Reduction, Cheng Chen, Carnegie Mellon University, Pittsburg, PA, Department of Ele. and Comp. Engring., Center for Bioimage Inforamtics, 2011 IEEE.
Comparison of Five Color Models in Skin Pixel Classification, Benjamin Zarit, Univ. of Illinois at Chicago, Electrical and Computer Sci., 1999.
UK Search Report received in Application No. GB 1203431.0, dated Feb. 28, 2012. (1 page).

* cited by examiner

IDENTIFYING POINTS OF INTEREST IN AN IMAGE

This application is a continuation-in-part of U.S. application Ser. No. 13/780,072 filed Feb. 28, 2013, the disclosure of which is hereby incorporated by reference in its entirety.

FIELD OF THE INVENTION

The present invention relates generally to the area of image processing, and especially to real-time applications in which such processing must be carried out and applied without slowing the image-transfer data-rate.

BACKGROUND OF THE INVENTION

An image stream, such as is found, for example, in television and digital video applications, consists of a time-ordered series of individual images, or frames. The images are often two-dimensional images of a three-dimensional scene, but any number of dimensions can, in principle, be ascribed to an image. For example, a one-dimensional image might be a slice of a two-dimensional image, or it might be a section of a sound-track applicable to the frame. A three-dimensional image may be an image of a scene in which all three space dimensions are represented explicitly. More dimensions could be added, for example, by imaging the x, y and z motions or accelerations. The depth dimension can also be represented by combining frames taken from different viewpoints to provide a stereoscopic or holographic view of a scene. The present invention can be applied generally to all of these examples, but is not limited to them.

In some applications, it is necessary to determine how the scene represented in an image stream changes from one frame to the next, or between images taken at the same time from different points of view as in stereoscopic projection. This may be the case, for example, where there is a requirement to measure the integrity of the image stream for quality-control purposes, or for the efficient application of a data compression algorithm. In stereoscopic projection, the depth, related to the horizontal separation (disparity) of the left and right hand images, must be monitored and controlled within limits set by viewing comfort and health considerations. As the scene itself changes, or as the camera moves in translation, pan, tilt or zoom, so one frame in a stream changes with respect to those either side of it. The assumption is usually made that the rate of change of any such changes is slow compared to the frame rate. It is then likely that views of the same physical object appear in adjacent frames, giving the possibility that its position may be tracked from frame to frame and used as part of a monitoring, or quality assurance process applied to the image stream.

Identifying an object, or a region of interest, which can be tracked from frame to frame, is not trivial. Whereas the human eye and brain can carry out this task with relative ease (if not speed), a computational algorithm must suffer from the disadvantage that it can easily recognize only simple shapes such as edges, lines or corners, and these may not be present in a particular set of frames. There are nevertheless many algorithms known in the art which perform the task with varying levels of success. US 2011/0026763 to Diggins teaches how low-bandwidth audio-visual content signatures can be generated from audio-video data streams and used for monitoring purposes. Knee, in GB 2474281, describes how image features may be identified from local data maxima in a frame. The present invention describes a relatively simple method which may be used to find points of interest in an image which is robust, but is also fast enough that it can be used in real-time applications.

SUMMARY OF THE INVENTION

According to one aspect of the invention there is provided a method of identifying one or more points of interest in an image consisting of a set of pixels in one or more dimensions, the method comprising the steps of
(a) dividing the image into one or more subsets of tiles consisting of pixels which are adjacent to each other in the image;
(b) within each tile finding the positions of the pixels with the maximum and/or minimum values, and ascribing at least the maximum value or the minimum value to the tile;
(c) identifying a tile with said maximum or minimum ascribed value respectively greater than or less than the maximum or minimum ascribed values of all tiles which are adjacent to said tile in the image; and
(d) selecting the position within the image of the pixel with the maximum or minimum value in said identified tile as a point of interest.

An image, which is in one or more dimensions, may be thought of as a representation of the mapping of a video or audio scene onto a space which may have more, the same, or fewer dimensions than the scene being represented by the image. For example, a camera lens carries out the mapping of a three-dimensional scene onto a two-dimensional photograph which carries the image of the scene. Another example is the stereophonic image of the sound created by an orchestra which is recorded as two or more time-series representations of acoustic pressure on a digital or analogue recording medium such as a tape. When a time-ordered series of images, or snapshots, is made of a changing scene, the series is often divided into a sequence of frames, each of which may be thought of as a single image. As in the example above, video images are often two-dimensional images of a three-dimensional scene, but any number of dimensions can, in principle, be ascribed to an image. For example, a one-dimensional image might be a slice of a two-dimensional image, or it might be a section of a sound-track applicable to a frame. A three-dimensional image may be an image of a scene in which all three space dimensions are represented explicitly. More dimensions could be added, for example, by imaging the x, y and z motions or accelerations. The depth dimension can also be represented by combining frames taken from different viewpoints to provide a stereoscopic or holographic view of a scene. The present invention can be applied generally to all of these examples, but is not limited to them.

The term pixel is usually applied to a pictorial image such as a digital photograph or a frame in a video sequence. It describes a single element of the image and may represent colour, intensity and hue at that point in the image using numbers. According to the present invention, the term is applied more generally to mean any individual element of an image, whether audio or visual. For example, a digital TV camera may use a lens to map the three-dimensional visual scene onto a two-dimensional array of N photo-sensitive units which are constructed from a number of light-sensitive elements. Three or four such elements may be associated with every unit in the array, each being sensitive to a different aspect of the light falling on them, such as red, blue and green colours. The individual elements are "read out" from the array as voltages or currents which are subsequently converted into numbers, one set of numbers being assigned to its corresponding unit. In this case, each unit can be considered to be one pixel of the image, so that the image therefore consists of N pixels.

An audio image may be a frame of audio sample values, where the sample values represent acoustic pressure. The frame may comprise a defined number of samples, representing a defined time period. The dimensions of such an image could be sample number, defining the temporal position within the frame; and, track number, identifying a particular audio source or destination.

A tile consists of a set of pixels which are adjacent to each other in the image. Tiles may be of different shapes and sizes, consisting of at least one pixel and not more than the total number of pixels in the image. The whole image, or just a part of it, may be divided into tiles. The tiles may all be the same shape and size, or they may have different shapes and dimensions. Generally, however, the area of interest of the image may be covered by multiple tiles which are adjacent to each other, i.e. each tile shares a common edge or a single point with a neighboring tile. In some circumstances, it may be an advantage to use tiles which overlap with each other. For example, an image may be divided into two different sets of tiles, each set covering the whole image, but using tiles of different sizes or shapes. Tiles in one set can overlap tiles in the other set. The method of the invention may be applied to both sets of tiles, and the list of points of interest extracted from the two sets of results.

BRIEF DESCRIPTION OF THE DRAWINGS

Examples of the method and system according to the present invention will now be described with reference to the accompanying drawings, in which.

DETAILED DESCRIPTION OF THE INVENTION

Figure 1:
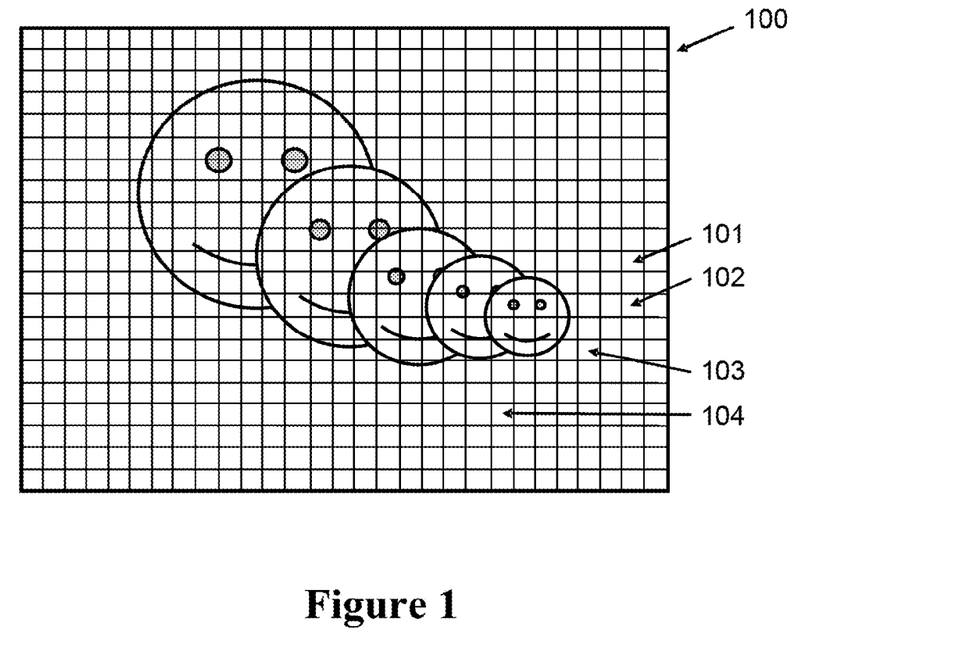
FIG. 1 shows a schematic diagram of an image.

A schematic representation of an image is shown in FIG. 1 at 100. The image, in this case, is divided into rectangular tiles, examples of which are indicated at 101-104. Each tile comprises many pixels. Although the tiles are all the same size and shape in FIG. 1, it will be apparent to one skilled in the art that the tiles can be of any shape in principle, and need not be all the same size. However, if the whole image is to be covered, the tiles must fit together without gaps, and having rectangular tiles of the same size on a uniform grid constitutes an easy implementation.

Figure 2:
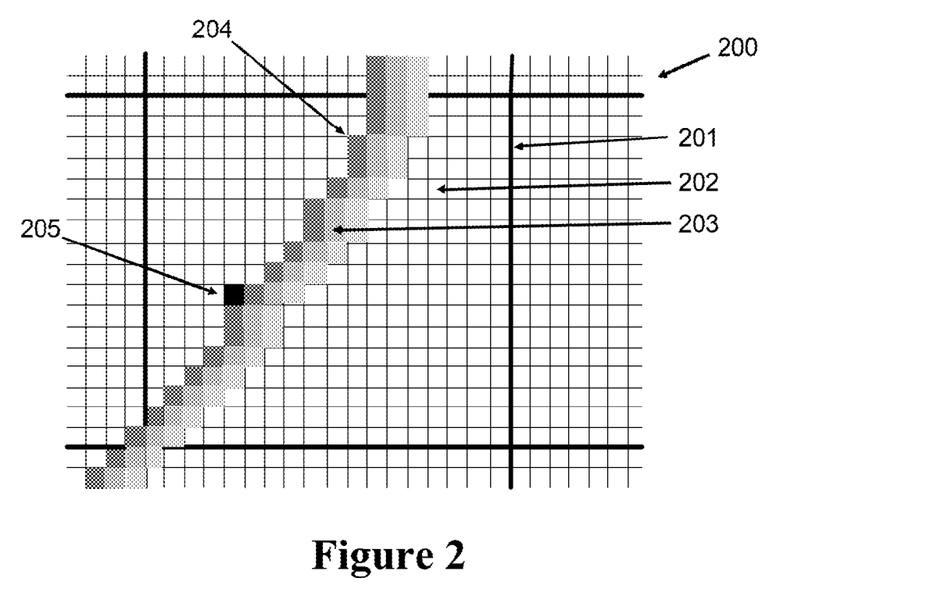
FIG. 2 illustrates pixels within a tile.

A closer view 200 of a tile 201 is shown in FIG. 2. The individual pixels are represented as rectangles. Pixel 202 is part of the background and is white, whereas pixels 203 and 204 are part of a graded feature of a foreground object. According to the invention, a number is ascribed to each pixel which is representative of it. For example audio may be represented by a measure of acoustic pressure; video pixels may be characterized by colour, intensity, hue or some combination of these parameters. Typically, a video image may be represented as a gray level or luminance value, say between 0 and 1023, used as this representative number. The white background (e.g. pixel 202) might then be given the number 940, whilst the completely black pixel 205 may be given the number 64.

Figure 3:
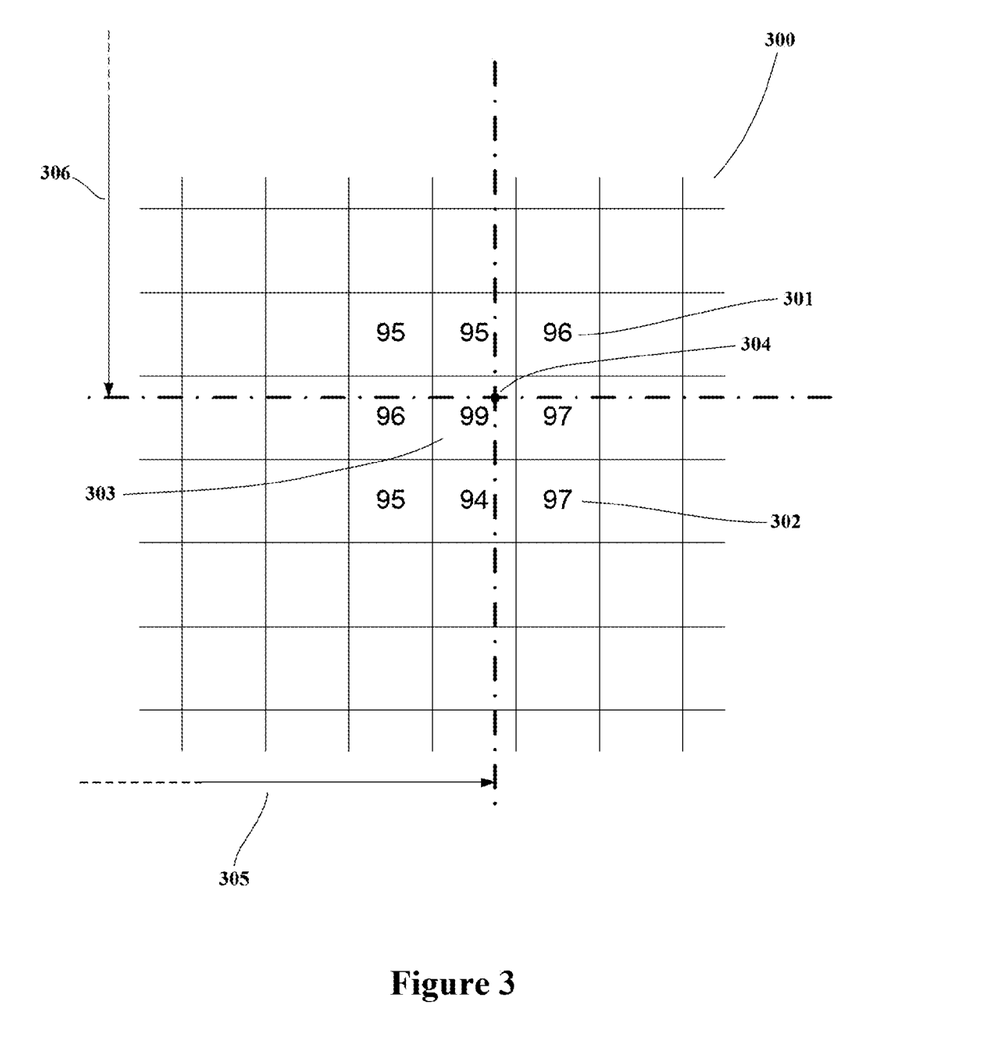
FIG. 3 shows a point of interest in an image

A representation of adjacent tiles in an image is shown in FIG. 3 at 300. The tile 303 has the number 99 ascribed to it using the method of the invention. That is, within tile 303, the maximum value of the pixels is 99, and position of the pixel with that value is indicated by the black dot 304. This is the number which is now ascribed to the whole tile 303. The same process is carried out on all the adjacent tiles, such as those indicated at 301 and 302, and the ascribed numbers are shown in the middle of each tile in FIG. 3. Clearly, in this case, tile 303 has a larger number ascribed to it than any of the ascribed numbers in the adjacent tiles. The pixel 304 therefore is selected as the point of interest, and its position within the whole image can be defined, according to Cartesian coordinates relative to an origin (not shown) at the top left-hand corner of the image, as a horizontal coordinate 305 and a vertical coordinate 306.

In video monitoring applications it is helpful to characterize a frame with a modest number of interest points, say 12, widely distributed over the area of the frame. This will enable the frame to be reliably identified at one or more points in a distribution chain and the relative positions of the points of interest to be used to identify scaling or translation of the identified picture. The method of the invention ensures that interest points cannot exist in adjacent tiles, and a grid of 18 tiles horizontally by 18 tiles vertically has been found suitable. Note that in this case the tiles will not be square, but will be the same shape as the frame itself. As will be explained, the tiles adjacent to the edge of the frame are discarded which means that the maximum possible number of interest points per frame is 128. It is not usually necessary to preserve the full spatial resolution of the video data; filtering and subsampling by up to a factor of 8 is typical. Of course this reduced spatial resolution reduces the storage and processing resources needed to create and use the feature points.

Figure 4:
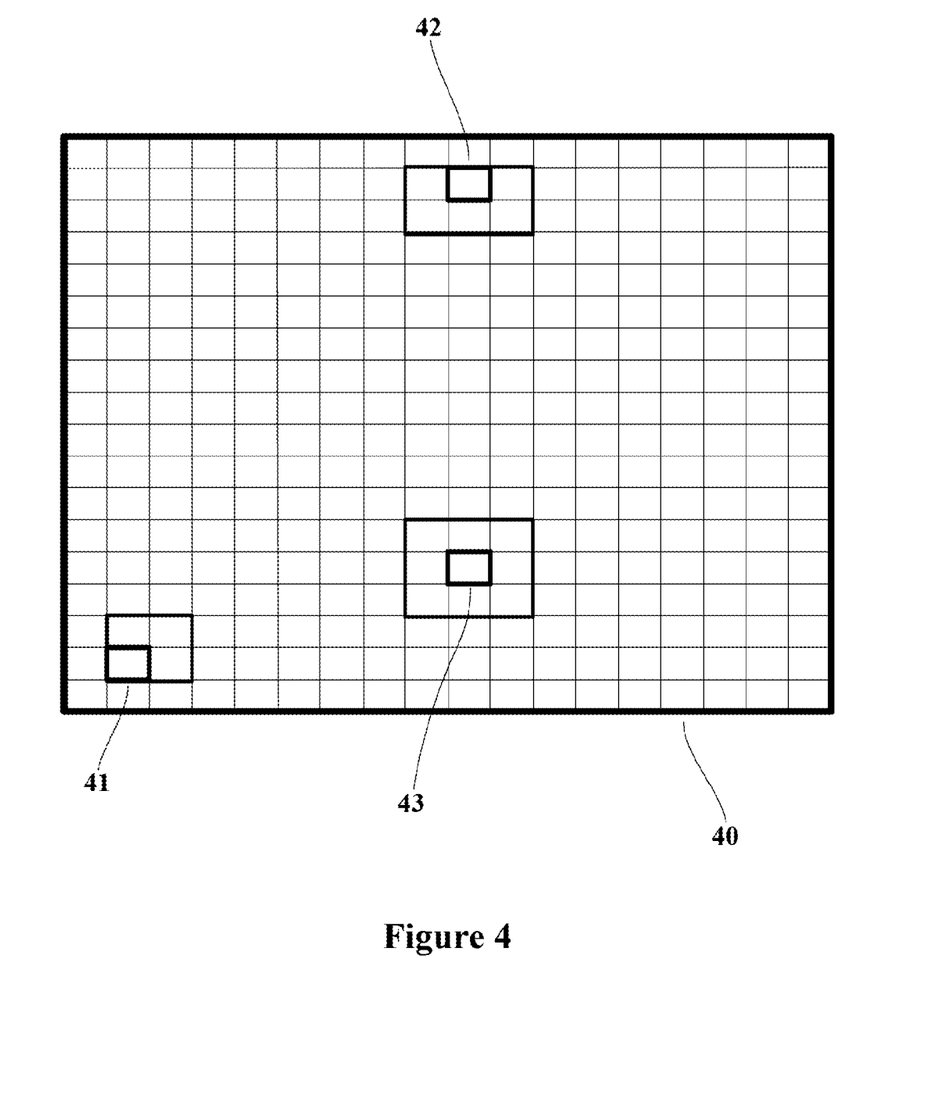
FIG. 4 shows exemplary tile positions within an image frame.

FIG. 4 shows the division of a frame 40 into 324 tiles. The 256 tiles which are not adjacent to any edge of the frame 40 are tested for the presence of feature points. As explained previously the test involves testing the extremal values (that is to say maximum or minimum values) for each tile with respect to values in the adjacent tiles. Only the non-frame-edge tiles are used in this test. Three examples of the tiles used are shown in FIG. 4. The corner tile 41 has 3 adjacent tiles; the non-corner edge tile 42 has 5 adjacent tiles; and, the tile not at a corner or edge 43 has 8 adjacent tiles.

Figure 5:
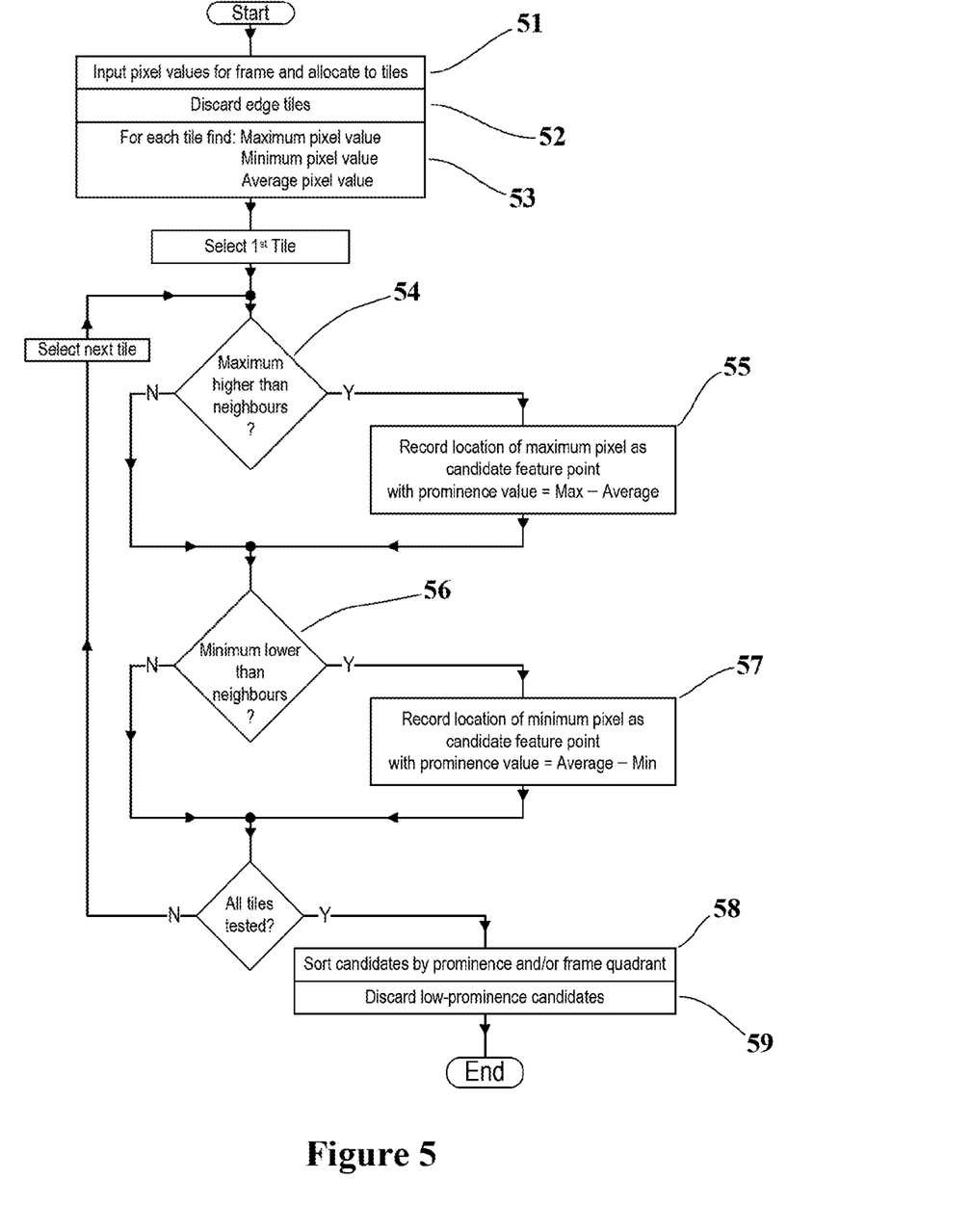
FIG. 5 shows a flow diagram of a process according to an embodiment of the invention.

A flow-diagram of an exemplary process for determining a set of feature points for a video image according to an embodiment of the invention is shown in FIG. 5. Pixel values are input to the process, typically they will be presented in the order corresponding to a scanning raster, with horizontal timing references interposed to indicate the left and right edges of the active frame area. In step 51 each incoming pixel value is associated with the tile of which it forms part. In step 52 pixel values for the tiles adjacent to all four edges of the frame are discarded.

In step 53 the pixel values of each tile are evaluated to find: the respective maximum-value pixel; the respective minimum-value pixel; and, the respective average pixel value for the tile. These values are then analyzed to determine a set of candidate feature points.

In step 54 the maximum value from the first tile is tested to see if it is higher than the maxima in the respective adjacent tiles (note that as edge tiles have been discarded they are not included in this comparison). If it is, the process moves to step 55, in which the location of the respective maximum in the tile under test is stored, together with its location, as a candidate feature point. A 'prominence' parameter, indicative of the visual significance of the candidate feature point is also stored. A suitable prominence parameter is the difference between the value of the maximum pixel and the average value of all the pixels in its tile.

In step 56 the pixel values of the tile are evaluated to find the respective minimum-value pixel for the tile, and if the minimum is lower than the minimum value for the adjacent tiles (excluding frame-edge tiles as before), the process moves to step 57 where the respective minimum value in the tile under test is stored, together with its location, as a candidate feature point. An associated prominence value, equal to the difference between the value of the minimum pixel and the average value of all the pixels in its tile is also stored.

Once all non-frame-edge tiles have been tested, the candidate feature points recorded in steps 55 and 57 are sorted according to their prominence values; and candidates with low prominence are discarded to reduce the number of feature point to a required number—say 12 feature point for the frame.

It is also helpful to sort the candidate feature points within defined regions within the frame. For example the frame can be divided in four quadrants and the candidates in each quadrant sorted separately. A minimum and a maximum number of feature points per quadrant can be set, subject to achieving the required total number of feature points for the frame. For example, if the candidates for a particular quadrant all have very low prominence, the two highest prominence candidates can be selected and additional lower prominence candidates selected in one or more other quadrants so as to achieve the required total number. This process is illustrated at step 59. Once the required number of feature points have been identified, the process ends.

A frame of data can thus be characterized by a set of feature point data where the data set comprises at least the position of each feature point within the frame and whether the feature point is a maximum value pixel or a minimum value pixel. In television images the positions of the feature points can be expressed as Cartesian co-ordinates in the form of scan-line numbers, counting from the top of the frame, and position along the line, expressed as a count of samples from the start of the line. If the frame has fewer or more than two dimensions then the positions of the feature points will be defined with fewer or more co-ordinates. For example feature points characterizing a single-channel audio stream would comprise a count of audio samples from the start of the frame and a maximum/minimum identifier.

It is an advantage of the invention that each determination of an interest point depends only on the values of the pixels from a small part of the image (i.e. the tile being evaluated and its contiguous neighbors). This means that it is not essential to have all the pixels of the frame simultaneously accessible in the feature point identification process, with consequent reduction in the need for data storage.

When feature points for an image are available, a candidate image can be compared with that image by evaluating the feature points for the candidate image and comparing the two sets of feature points. Depending on the application, it may be helpful to detect a match even though a simple affine dimensional transformation has been applied to the candidate image. For example the feature points of one image may be shifted (positionally translated) or horizontally or vertically scaled versions of the feature point of the other image. Sometimes it will be helpful to declare a match when only part the respective images match and not all of the feature points can be matched.

Figure 6:
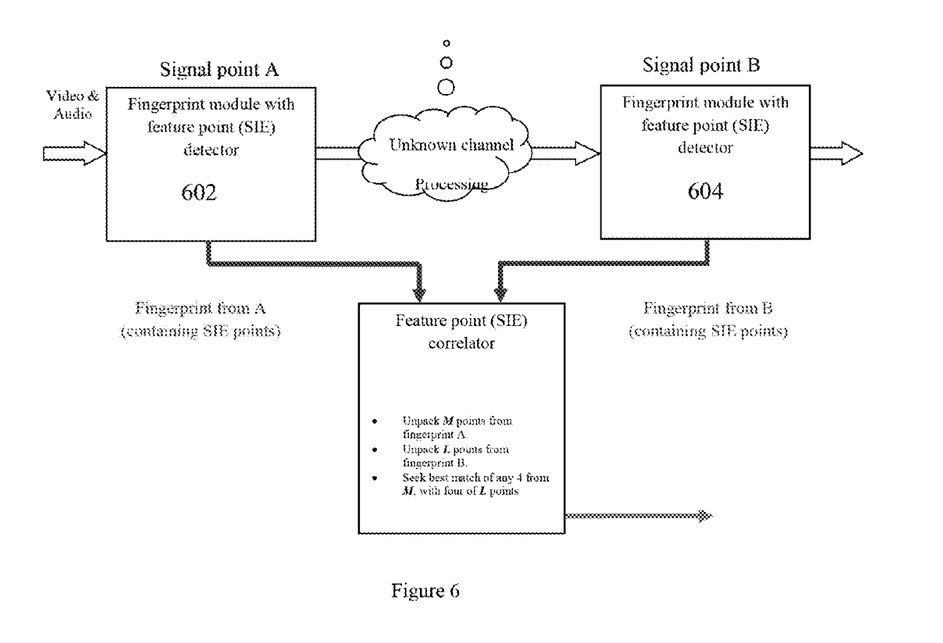
FIG. 6 shows a diagram of a system according to an embodiment.

This aspect of the invention will now be described in more detail, with reference initially to FIG. 6.

A video and audio delivery channel is shown, with Fingerprint Module 602 at signal point A and Fingerprint Module 604 at signal point B. Both Fingerprint Modules incorporate a feature point detector which may take the form described above and which serves to provide feature points, which will be referred to as SIE points (for Simple Isolated Extrema).

The feature point detector at A will detect N SIE points and from these select the 'best' M points. These M SIE points will then be packed into a fingerprint with other fingerprint data as appropriate. Similarly, the feature point detector at B will detect N (or a different number) of SIE points and from these select the 'best' L points. These L SIE points will again be packed into a fingerprint with other fingerprint data as appropriate.

The fingerprints are provided to Feature Point Correlator 606, which may be physically distant from one or both of signal point A and signal point B. The Feature Point Correlator 606 serves to:

Unpack M points from fingerprint A.
Unpack L points from fingerprint B.
Seek best match of (in this example) any 4 from M, with four of L points In more detail, once the temporal alignment has been achieved by any appropriate means, and the fingerprint data is unpacked, there are M SIE points from A, and L SIE points from B. The Feature Point Correlator seeks to match four points between A and B, assuming a four-point, non-rotational, non-shear affine model. This is achieved by selecting a candidate point $P_0$ from set A, then selecting a candidate match $L_0$ from the B set (subject to some matching conditions that eliminate infeasible matches. Following this, a second (different) candidate point $P_1$ from the A set is chosen. Using the geometric relationship between $P_0$ and $P_1$ together with some assumed constraints on the minimum and maximum scaling differences that might be encountered between the remote and local images, it is then possible to reduce the search space for candidate points $L_1$ in set B. Usually, only a few (if any) points satisfy the constraints. For all viable $L_1$ candidate points, the pairs of points, $(P_0, P_1)$ and $(L_0, L_1)$ enable a four-parameter model to be fitted between the two images. This can be written as the following;

$$dx = L_x^0 - L_x^1 Dx = P_x^0 - P_x^1$$

$$dy = L_y^0 - L_y^1 Dy = P_y^0 - P_y^1 \qquad (1)$$

The pairs of points, $(P_0, P_1)$ and $(L_0, L_1)$ enable a four-parameter model to be fitted. This is depicted graphically in FIG. 7. From the model, any subsequent point $P_i$ can be mapped to the equivalent $L_i$ according to:

$$L_x^i = L_x^0 - \{P_x^0 - P_x^i\} dx/Dx$$

$$L_y^i = L_y^0 - \{P_y^0 - P_y^i\} dy/Dy \qquad (2)$$

Figure 7:
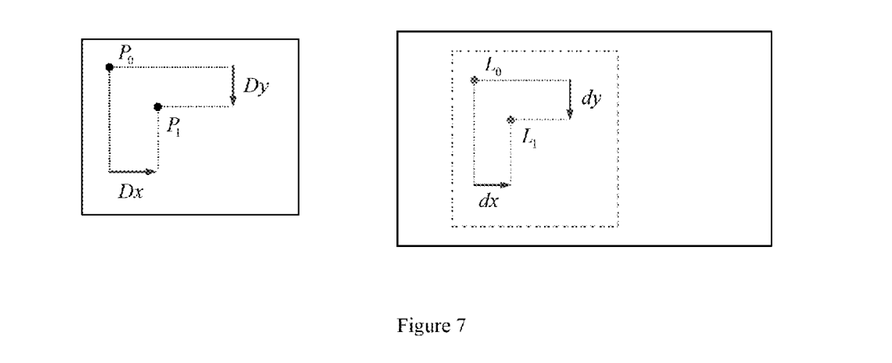
FIGS. 7 to 11 show schematic diagrams illustrating a matching process used in the system of FIG. 6.

It is then possible to choose a third (different) point, $P_2$, and this time, using the model one can predict the position of the corresponding $L_2$. The points are then searched to find the closest one (measured by Manhattan distance). If the closest candidate distance is above a tolerance threshold, $P_2$ is discarded and an alternative is tested (until a match is found or all remote points are exhausted). On the other hand, if the closest $L_2$ candidate distance is below the specified tolerance, we choose a fourth (different) point, $P_3$, then predict the position of the corresponding $L_3$, then search all the local points for the closest match. We combine the $L_2$ and $L_3$ match error Manhattan distances, and keep track of the best (smallest) that is found throughout the entire search.

It is a useful feature of embodiments of the present invention that matching constraints are placed on the first two pairs of points.

The first of the constraints is that on $L_0$ given an initial choice $P_0$. The trivial condition is that the points must have the same parity i.e. maxima paired with maxima, minima with minima. This eliminates some of the candidates immediately.

Figure 8:
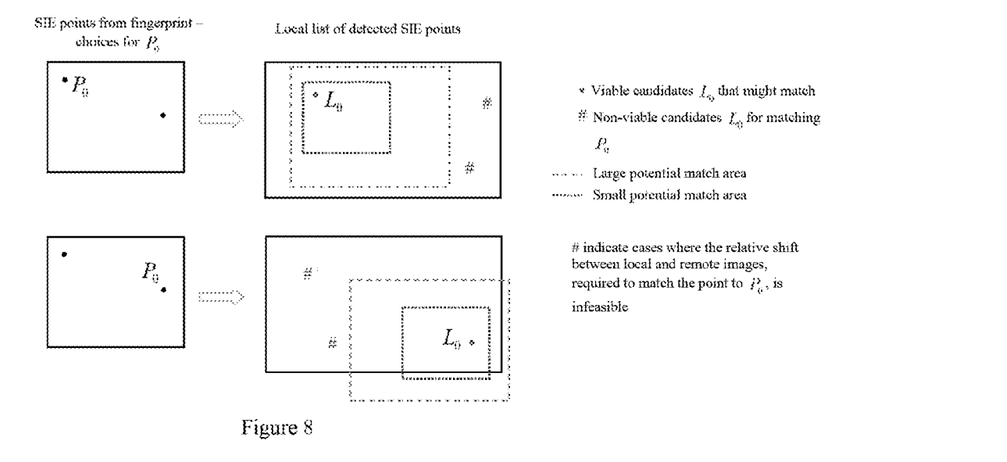

Beyond this, as FIG. 8 illustrates, not all points from set B can be viably paired with all choices of $P_0$. For example, a point in the top left hand corner cannot be matched with a point in the bottom right, because this would imply virtually no overlap of image area.

To assert this in a formulaic way, everything may be considered in dimensionless fractional coordinates so that the x,y coordinates in both images lie in the range 0 to 1 although we do not know the offset and scaling between $x_A$ and $x_B$, or correspondingly for y.

Figure 9:
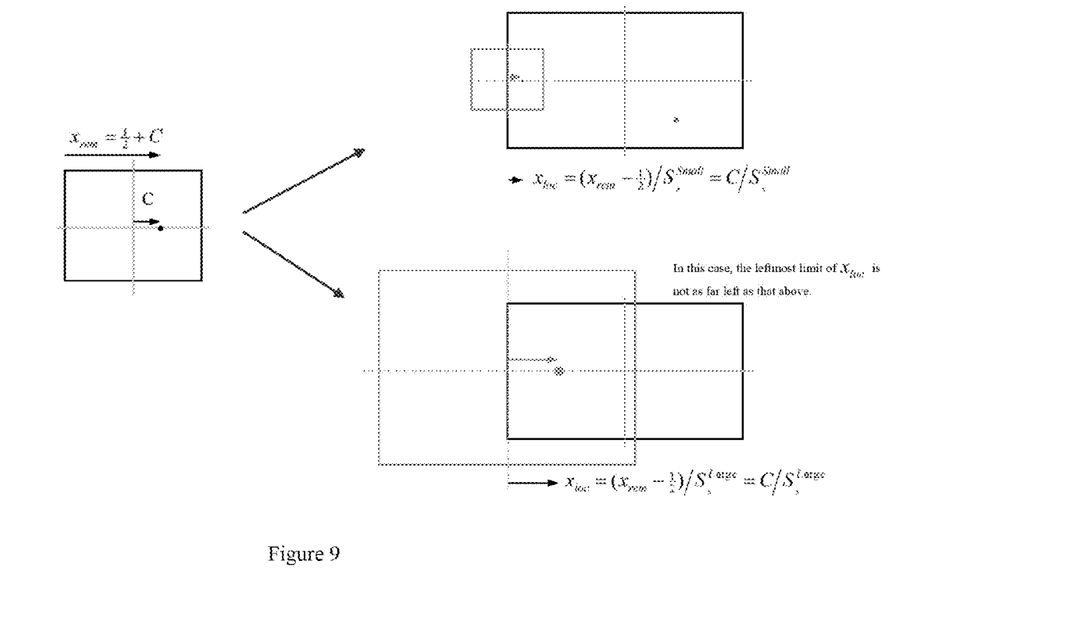

Turning to the diagram of FIG. 9, it is assumed that at least half of the A image must overlap B and that one image may be scaled with respect to the other. This scaling is unknown at this stage of course, but it is small scalings that are important here because this is the direction that limits how far $L_0$ can extend.

Based on the assumed worst-case scenario where everything less than $x_A = \frac{1}{2}$ simply does not exist in the B image, cases are considered where $x_A > \frac{1}{2}$ with respect to the B image (LHS in FIG. 9), then any match for this position in the B image $x_B$ cannot be less than $(x_A - \frac{1}{2})/S_x$, where the factor ½ accounts for the assertion that at least half of the remote image must overlap the local one, and $S_x$ is the scaling factor between A and B. FIG. 9 shows two potential values of $S_x$. The upper part of FIG. 9, $S_x^{Small}$, corresponding to the smaller A image (and thus actually the larger $S_x^{Small}$ value) is the one of interest because this limits the leftmost position at which one expects to find a point $x_B$ that viably matches $x_A$. A converse argument leads to a rightmost bound of than $1-(x_A-\frac{1}{2})/S_x$, and this can be applied in the y direction also, so that, for a given choice of $P_0 = (P_x^0, P_y^0)$, it is appropriate to constrain $L_0 = (L_x^0, L_y^0)$, so that:

$$(P_x^0 - \tfrac{1}{2})/S_x \geq L_x^0 \geq 1 - (P_x^0 - \tfrac{1}{2})/S_x$$

$$(P_y^0 - \tfrac{1}{2})/S_y \geq L_y^0 \geq 1 - (P_y^0 - \tfrac{1}{2})/S_y \quad (3)$$

If the bounds are negative or greater than unity, they are of course clipped to this range.

Figure 10:
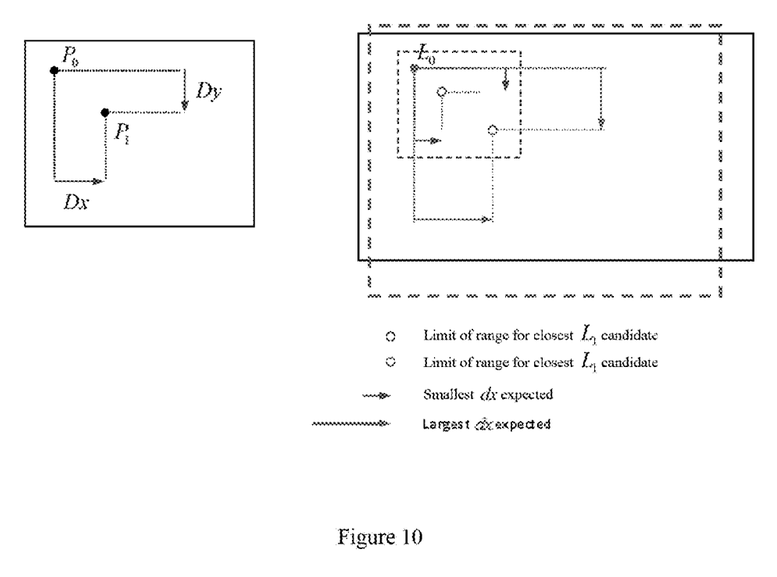

The second of the constraints, is on $P_1$ – a second point chosen from the fingerprint SIE points. The trivial constraint is obviously that $P_1 \neq P_0$. Beyond this, the practical constraint is imposed that the difference in x and the difference in y coordinates between $P_1$ and $P_0$, defined Dx and Dy as shown in FIG. 10, must be greater than some modest threshold—nominally 0.05. This is because, if one point is directly above/below or directly right/left of the other, then it is not possible to estimate the scaling parameters for the direction in which there is no change. The threshold could be set less than 0.05 but the smaller the difference, the greater the potential for inaccuracy in the scaling parameter estimate. So:

$$|Dx| > 0.05$$

$$|Dy| > 0.05 \quad (4)$$

The next, third, constraint is the selection of an $L_1$ candidate, given the candidates for $P_0$, $L_0$ and $P_1$, and the distances Dx and Dy we have thus far. As with $L_0$, any $L_1$ must have the same parity as $P_1$. Then, the position of $L_1$ will enable us to fully specify the four parameter fit once we have it, by identifying dx and dy. Although these are unknown, we can say that the signs of them ought to be consistent with Dx and Dy and they ought to be no less than a certain factor smaller, and no more than another factor bigger. FIG. 10 below illustrates this graphically.

Assuming limits on dx such that:

$$|Dx| \times X\text{scalemin} \leq |dx| \leq |Dx| \times X\text{scalemax} \quad (5)$$

(and similarly for dy), we derive the derive limits on the range of positions for $L_1$:

$$L_A = L_x^0 - Dx \times X\text{scale}_{min}$$

$$L_B = L_x^0 - Dx \times X\text{scale}_{max}$$

$$L^1_{x\text{-}min} = \min(L_A, L_B)$$

$$L^1_{x\text{-}max} = \max(L_A, L_B) \quad (6)$$

Similarly for y.

With these constraints, we now consider candidates among the local points that are in the range $$L^1_{x\text{-}min} \leq L^1_x \leq L^1_{x\text{-}max}$$

$$L^1_{y\text{-}min} \leq L^1_y \leq L^1_{y\text{-}max} \quad (7)$$

From equations 2, the equivalent range of the A image in relation to B image co-ordinates is $$L^A_{x\text{-}min} = L^0_x - \{P^0_x - P_{x\text{-}min}\}dx/Dx = L^0_x - P^0_x dx/Dx$$

$$L^A_{x\text{-}max} = L^0_x - \{P^0_x - P_{x\text{-}max}\}dx/Dx = L^0_x - \{P^0_x - 1\}dx/Dx$$

$$L^A_{y\text{-}min} = L^0_y - \{P^0_y - P_{y\text{-}min}\}dy/Dy = L^0_y - P^0_y dy/Dy$$

$$L^A_{y\text{-}max} = L^0_y - \{P^0_y - P_{y\text{-}max}\}dy/Dy = L^0_y - \{P^0_y - 1\}dy/Dy \quad (8)$$

where $P_{x\text{-}min}$ and $P_{x\text{-}max}$ are simply the 0.0 and 1.0 limits of the dimensionless image co-ordinates of the A image. There is another check on the $(P_0, P_1)$, $(L_0, L_1)$ match that can now be done which further eliminates spurious cases, before we move on to look for a third and then fourth pair of candidate matching points. We can use these equations, we determine the image A width and height:

$$\text{width}_{P(A)} = L^A_{x\text{-}max} - L^A_{x\text{-}min}$$

$$\text{height}_{P(A)} = L^A_{y\text{-}max} - L^A_{y\text{-}min} \quad (9)$$

From these, we can test whether the aspect ratio of this potential match is believable or not. The reasoning is applied that $\text{Arc}_{max} = 2.5:1$ is an upper bound (the widest format anticipated is Cinemascope which is 2.35:1), and that the smallest is $\text{Arc}_{min} = 0.4:1$ (this may possibly be a little too small, but is an adjustable parameter). Thus, we disqualify the $(P_0, P_1)$, $(L_0, L_1)$ match and move on to a new candidate, unless, $$\text{Arc}_{min} * \text{height}_{P(A)} \leq \text{width}_{P(A)} \leq \text{Arc}_{max} * \text{height}_{P(A)} \quad (10)$$

Figure 11:
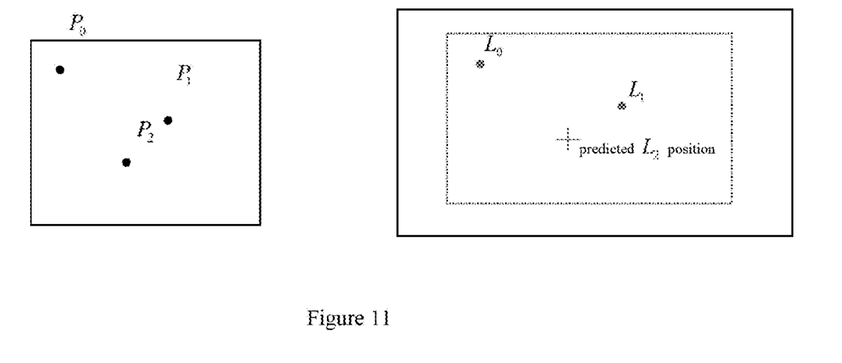

Once two viable candidate pairs, $(P_0, P_1)$, $(L_0, L_1)$, have been identified, the fit can then be defined for all other points. That is to say, using the values of dx, dy, Dx, Dy, and either one of $P_0$ or $P_1$, then given a third point from the fingerprint $P_2$ we can predict exactly where it should be found in the other image, using equations 2—see FIG. 11 which illustrates that given two pairs of points, we obtain a model for offset and scaling whereby, given any third point in the A image, we can predict its corresponding position in the B image.

$$L^2_{x(predicted)} = L^0_x - \{P^0_x - P^2_x\}dx/Dx$$

$$L^2_{y(predicted)} = L^0_y - \{P^0_y - P^2_y\}dy/Dy \quad (11)$$

Turning to the fourth constraint: Taking this predicted $L_2$ point, we measure the Manhattan distance between it and all SIE points in the B image that are not $L_0$, or $L_1$, and keep track of the closest point. If the closest distance, $d_0$ is greater than a given 'Acceptance Threshold' ~0.01, then $P_2$ is rejected, and we proceed to a new one. If the closest point is good enough, we adopt it as the $L_2$ candidate, and proceed to pick a fourth point, $P_3$ ($\neq P_0$, $P_1$, $P_2$).

Using this we predict the corresponding $L_3$ position, and search all SIE points in the B image that are not $L_0$, $L_1$, $L_2$ to identify the point closest. We label the closest distance, $d_1$, and define the four point match error as $$d_{4pt} = d_0 + d_1 \quad (12)$$

At this stage, 'a' four point match candidate has been found. Finding 'a' match entails the nested loop For all A points pick $P_0$
For all B points, pick $L_0$ (conditionally—constraint 1)
    For all A points pick $P_1$ that is not $P_0$ (conditionally—constraint 2)
        For all B points, pick $L_1$ that is not $L_0$ (conditionally—constraint 3)
            For all A points $P_2$ that is not $P_0$ or $P_1$
            For all B points pick $L_2$ that is not $L_0$ or $L_1$ (conditionally-constraint 4) (match error=$d_0$)
            For all A points pick a $P_3$ that is not $P_0$ or $P_1$ or $P_2$
            For all B points pick an $L_3$ that is not $L_0$ or $L_1$ or $L_2$, (match error=$d_1$)
            {
            Keep track of the smallest combined match error $d_{4pt}$. (i.e. record distance, and all loop/list indices)
            }
}

Upon completion of this, the resulting minimum error, $d_{4pt}$ (together with the corresponding point loop/list indices), contains the best match. Given this match, the inferred picture aspect ratio and position (in local co-ordinate units) are compared with the match from the previous field. The change in translation, and the change in aspect ratio are measured as, $$\left.\begin{array}{l} MatchedXscaleFactor[n] = (dx/Dx) \\ MatchedYscaleFactor[n] = (dy/Dy) \\ MatchedTopLeftX[n] = L^0_x - (P^0_x - 0.0) \times (dx/Dx) \\ MatchedTopLeftY[n] = L^0_y - (P^0_y - 0.0) \times (dy/Dy) \\ MatchedBottomRightX[n] = L^0_x - (P^0_x - 1.0) \times (dx/Dx) \\ MatchedBottomRightY[n] = L^0_y - (P^0_y - 1.0) \times (dy/Dy) \end{array}\right\} \begin{array}{l} \text{current} \\ \text{match} \end{array} \quad (13)$$

$$dL = MatchedTopLeftX[n] - MatchedTopLeftX[n-1]$$

$$dT = MatchedTopLeftY[n] - MatchedTopLeftY[n-1]$$

$$dR = MatchedBottomRightX[n] - MatchedBottomRightX[n-1]$$

$$dB = MatchedBottomRightY[n] - MatchedBottomRightY[n-1]$$

$$dShift = \begin{array}{l} \max[|dL|, |dR|, |dT|, |dB|] \quad \text{if a match was obtained for the previous field} \\ 0.0 \quad \text{otherwise} \end{array}$$

$$dAspect = \begin{array}{l} \max[|dR - dL|, |dB - dT|] \quad \text{if a match was obtained for the previous field} \\ 0.0 \quad \text{otherwise} \end{array}$$

The match is accepted providing, $$d_{4pt} < 0.01$$

$$dShift < 0.04$$

$$dAspect < 0.04 \quad (14)$$

Without the conditional constraints, matching is a large problem, because with there are M (fingerprint) points from signal point A, and L from signal point B, the nested loop entails a search space of size of $(M \times N)^4$, perhaps $10^{12}$. However, with the constraints as detailed above, this number is dramatically reduced, perhaps to $10^6$. The processing cost of the matches is not unduly high—it entails memory reads, a handful of multiplications and a pair of divisions in one of the stages (typically, around 1500 hundred of these), and measurements of Manhattan distances which are comparatively inexpensive. The matching constraints make the problem tractable.

It is important to consider the SIE data fingerprint payload. For an assumed maximum image size of 1920×1080, the SIE coordinates require 2×11 bits, plus one bit to indicate maxima or minima. Thus, each point requires three bytes of fingerprint payload, and 36 bytes in total are required to carry all 12 points. In order to simplify the fingerprint data structure, 36 bytes may always packaged, irrespective of the number of points actually detected (it is not common, but occasionally the number of detected points is less than 12.) To this end, the 'spare' bit (2×11 bits, plus max/min flag=23 bits out of 24) may used to flag whether the point is valid. In an alternative arrangement, only valid points are transmitted. Also, it should be understood that other numbers of points may be used, with 36 points being another example that has proven useful.

The described method is very simple and is readily implemented in hardware as well as the described software implementation. The method does not require a framestore, which is extremely advantageous. (One may be required in the software model, to overlay points and show matching etc., but this is not pivotal to the detection algorithm).

There are further strategies that might to shorten the search further. For example, if we can be sure that the previous field was a good match (perhaps, is matched well with the previous N), then we might eliminate at all stages, local points that are not within say 10% of the fingerprint ones. This kind of approach could significantly reduce the search space, but does rely upon not erroneously believing that the last match was a good one.

In some applications it may not be necessary to compare whole images. For example it may only be required to detect that a particular known object or graphic feature is present within an image. In this case, an arbitrary image containing the known object or graphic feature can be evaluated to detect interest points, and the interest points not forming part of the known object or feature discarded prior to being used in an image comparison process.

As the skilled person will appreciate from the above disclosure, the invention may be applied in various different ways. For example, it will usually be useful to low-pass filter the pixel value prior to identifying the feature points. The filter may operate in more than one dimension, though for images, horizontal filtering has been found adequate. The data may be down-sampled prior to analysis. Although this simplifies the feature point determination, because fewer pixels need to be analyzed, it has the disadvantage of reducing the precision of the feature point co-ordinate values and thus risking ambiguity when sets of feature points are compared. The determination of feature points may use only maximum pixel values or only minimum pixel values.

The invention claimed is:

1. A method of searching images, the method comprising the steps of:
  in an image processor selecting a plurality of points of interest;
  in which each said point of interest is represented by one or more co-ordinates of a pixel;
  in which a first set of points of interest from a first image A are tested for matching against a second set of points of interest from a second image B, by
  selecting a candidate point $P_0$ from the image A;
  selecting a candidate match $L_0$ from the image B;
  selecting a second different candidate point $P_1$ from the image A;
  using the geometric relationship between $P_0$ and $P_1$ to define a search space for candidate points $L_1$ in the image B;
  for any viable $L_1$ candidate points, using the pairs of points, $(P_0, P_1)$ and $(L_0, L_1)$ to define an assumed model to be fitted between the two images;
  selecting a third different candidate point $P_2$ from the image A;
  using said model to predict the position of a candidate match $L_2$ in the image B; and
  testing for the presence of a feature point at location $L_2$ in the image B.

2. The method according to claim 1 where the said image is a frame of video data and the pixel values are related to luminance or colour values.

3. The method according to claim 2 in which tiles at the edge of the frame are disregarded.

4. The method according to claim 1 in which the representation of each said point of interest includes a prominence parameter.

5. The method according to claim 4 in which the said prominence parameter is a measure of the amount that the value of a pixel differs from the average pixel value for the pixels of the tile that includes that pixel.

6. The method according to claim 4 in which points of interest having low prominence are discarded.

7. The method according to claim 1 in which the said image is divided into a plurality of regions and the said image is characterised by at least one interest point in each region.

8. The method according to claim 1 in which pixel values are low-pass filtered prior to the identification of the said point of interest.

9. The method according to claim 1, wherein the step of using the geometric relationship between $P_0$ and $P_1$ to define a search space for candidate points $L_1$ in image B comprises using at least one defined constraint on the minimum or maximum scaling differences between the image A and image B to define a reduced search space for candidate points $L_1$ in image B.

10. The method according to claim 1, wherein the step of selecting a candidate match $L_0$ from image B is subject to a minimum implied overlap in translation between image A and image B.

11. The method according to claim 1, in which a search space is reduced by imposing a constraint selected from the group consisting of an aspect ratio change limit and a temporal change limit.

12. The method according to claim 1 in which the step of testing for the presence of a feature point at location $L2$ in image B has a predefined tolerance.

13. A non-transitory computer readable medium comprising a computer program product storing computer instructions, which when executed by a computer implements a method of searching images comprising the steps of:
  selecting a plurality of points of interest,
  in which each said point of interest is represented by one or more co-ordinates of a pixel;
  in which a first set of points of interest from a first image A are tested for matching against a second set of points of interest from a second image B, by
  selecting a candidate point $P_0$ from the image A:
  selecting a candidate match $L_0$ from the image B:
  selecting a second different candidate point $P_1$ from the image A;
  using the geometric relationship between $P_0$ and $P_1$ to define a search space for candidate points $L_1$ in the image B;
  for any viable $L_1$ candidate points, using the pairs of points, $(P_0, P_1)$ and $(L_0, L_1)$ to define an assumed model to be fitted between the two images;
  selecting a third different candidate point $P_2$ from the image A;
  using said model to predict the position of a candidate match $L_2$ in the image B; and
  testing for the presence of a feature point at location $L_2$ in image B.

14. The non-transitory computer readable medium according to claim 13 where the said image is a frame of video data and the pixel values are related to luminance or colour values.

15. The non-transitory computer readable medium according to claim 13 in which tiles at the edge of the frame are disregarded.

16. A method for processing a first image in accordance with image boundaries of a matched second image, the method comprising the steps of:
  analysing a first set of coordinate points from a first image having a first image boundary with a second set of coordinate points from a second image having a second image boundary, the sets of coordinate points to identify a match, wherein relative positions of matched points from respective images are used to infer relative positions of the respective image boundaries; and
  processing the first image in accordance with said relative positions;
  in which a candidate match between sets implied by the initial matching of two points in each group, is used to predict the relative coordinate scaling between the two sets of points, in order to predict and test the correspondence of subsequent pairs of points in the respective sets; and
  in which the predicted relative scaling of a two point match between sets is used to reject potential third point matches that have a match error above a given threshold, and thus reduce the search space.

17. A method for processing a first image in accordance with image boundaries of a matched second image, the method comprising the steps of:
- analysing a first set of coordinate points from a first image having a first image boundary with a second set of coordinate points from a second image having a second image boundary, the sets of coordinate points to identify a match, wherein relative positions of matched points from respective images are used to infer relative positions of the respective image boundaries; and
- processing the first image in accordance with said relative positions;
- in which a candidate match between sets implied by the initial matching of two points in each group, is used to predict the relative coordinate scaling between the two sets of points, in order to predict and test the correspondence of subsequent pairs of points in the respective sets; and in which the predicted relative scaling of a two point match between sets is used to reject potential fourth point matches that have a match error above a given threshold so as to and reduce the search space.

\* \* \* \* \*